United States Patent [19]
Audebert

[11] Patent Number: 5,937,068
[45] Date of Patent: *Aug. 10, 1999

[54] SYSTEM AND METHOD FOR USER AUTHENTICATION EMPLOYING DYNAMIC ENCRYPTION VARIABLES

[75] Inventor: Yves Audebert, Foster City, Calif.

[73] Assignee: Activcard, Sursesnes Cedex, France

[*] Notice: This patent is subject to a terminal disclaimer.

[21] Appl. No.: 08/942,904

[22] Filed: Oct. 2, 1997

Related U.S. Application Data

[63] Continuation-in-part of application No. 08/620,240, Mar. 22, 1996, Pat. No. 5,802,176.

[51] Int. Cl.⁶ .............................. H04K 1/00; H04L 9/00; G06K 5/00
[52] U.S. Cl. .............................. 380/23; 235/382; 380/25; 380/49
[58] Field of Search .............................. 380/23, 25, 49; 235/382

[56] References Cited

U.S. PATENT DOCUMENTS

| | | |
|---|---|---|
| 3,806,874 | 4/1974 | Ehrat . |
| 4,601,011 | 7/1986 | Grynberg . |
| 4,720,860 | 1/1988 | Weiss . |
| 4,800,590 | 1/1989 | Vaughan . |
| 4,885,778 | 12/1989 | Weiss .................................. 380/48 |
| 4,998,279 | 3/1991 | Weiss .................................. 380/23 |
| 5,060,263 | 10/1991 | Bosen et al. . |
| 5,163,097 | 11/1992 | Pegg .................................. 380/21 |

*Primary Examiner*—Stephen C. Buczinski
*Attorney, Agent, or Firm*—Stevens, Davis, Miller, & Mosher, L.L.P.

[57] ABSTRACT

The system includes a first card-like unit adapted to communicate with a second unit giving only conditionally access to a function. Both units are capable of running software for generating a password by means of encryption of a plurality of dynamic variables produced separately but in concert (so as to have a predetermined relationship, such as identity, with one another) in the units. The encryption is carried out in each unit by a public algorithm using a dynamically varying encryption key. Each time an access request is issued by a card user, the key is modified as a function of the number of access requests previously formulated by the card user. Access to the function is granted when the passwords generated in the units have a predetermined relationship (such as identity) with each other. In a "virtual token" implementation, the first unit can be a smart card, which stores the dynamic key and the variable representing the number of formulated authentication requests and executes an encryption algorithm, a smart card reader and a computer such as a personal computer. Either the smart card reader or the personal computer can generate the time dependent variable. In a "software token" implementation, the functions of the first unit are performed by a personal computer, thus eliminating the need for a smart card or a smart card reader.

53 Claims, 5 Drawing Sheets

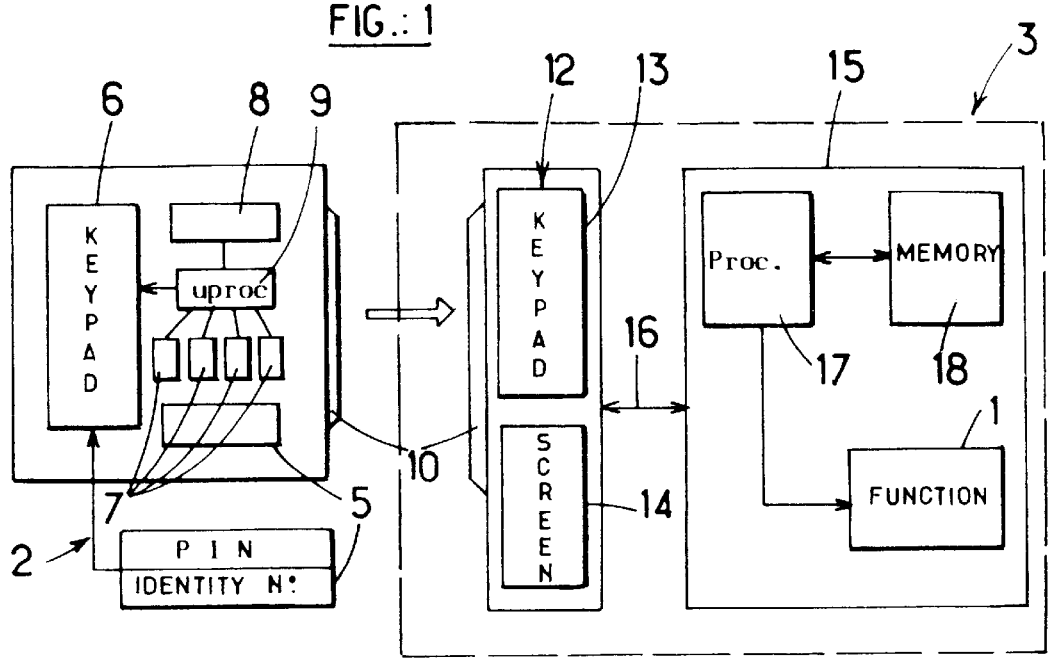
FIG.: 1
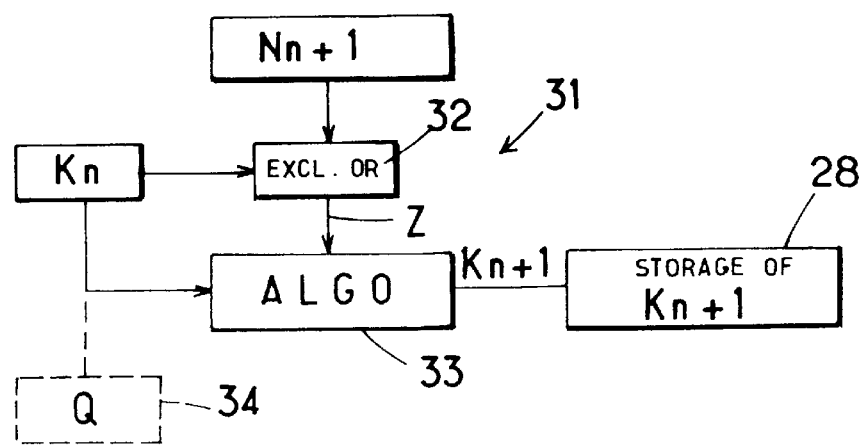
FIG.: 3

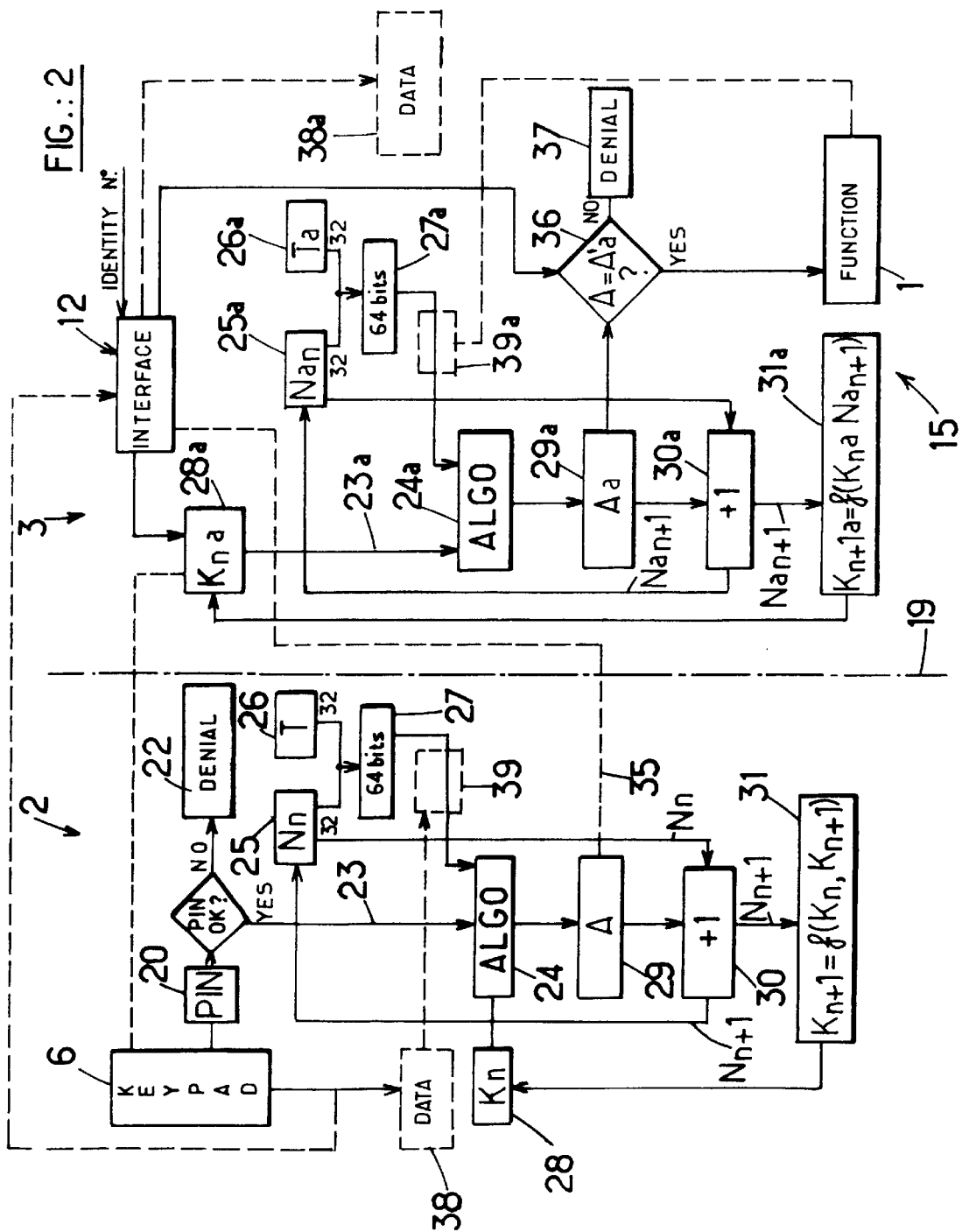

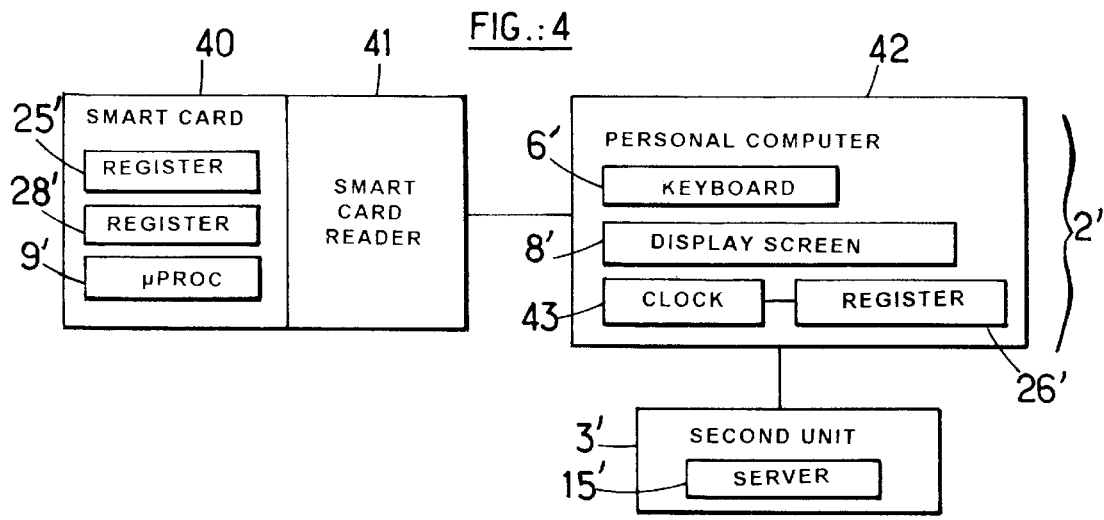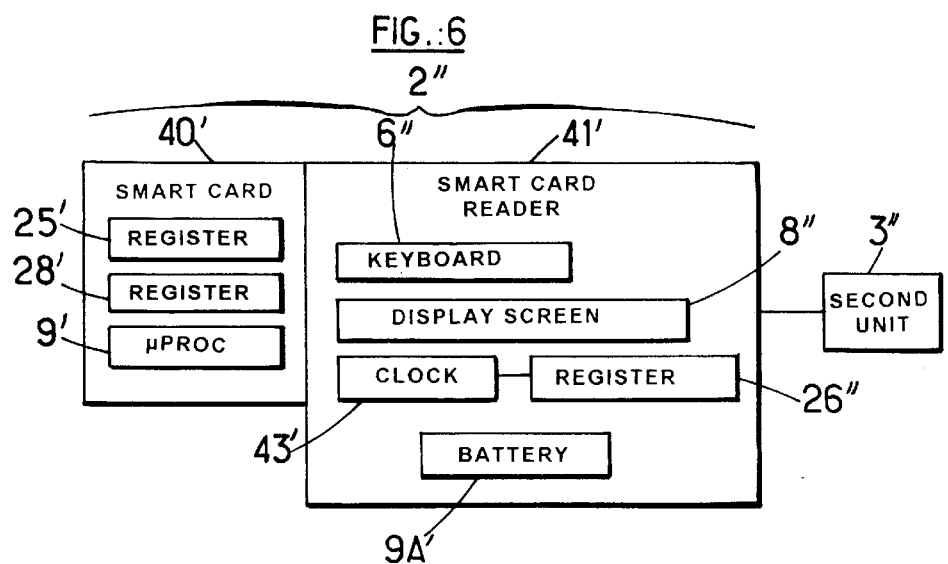

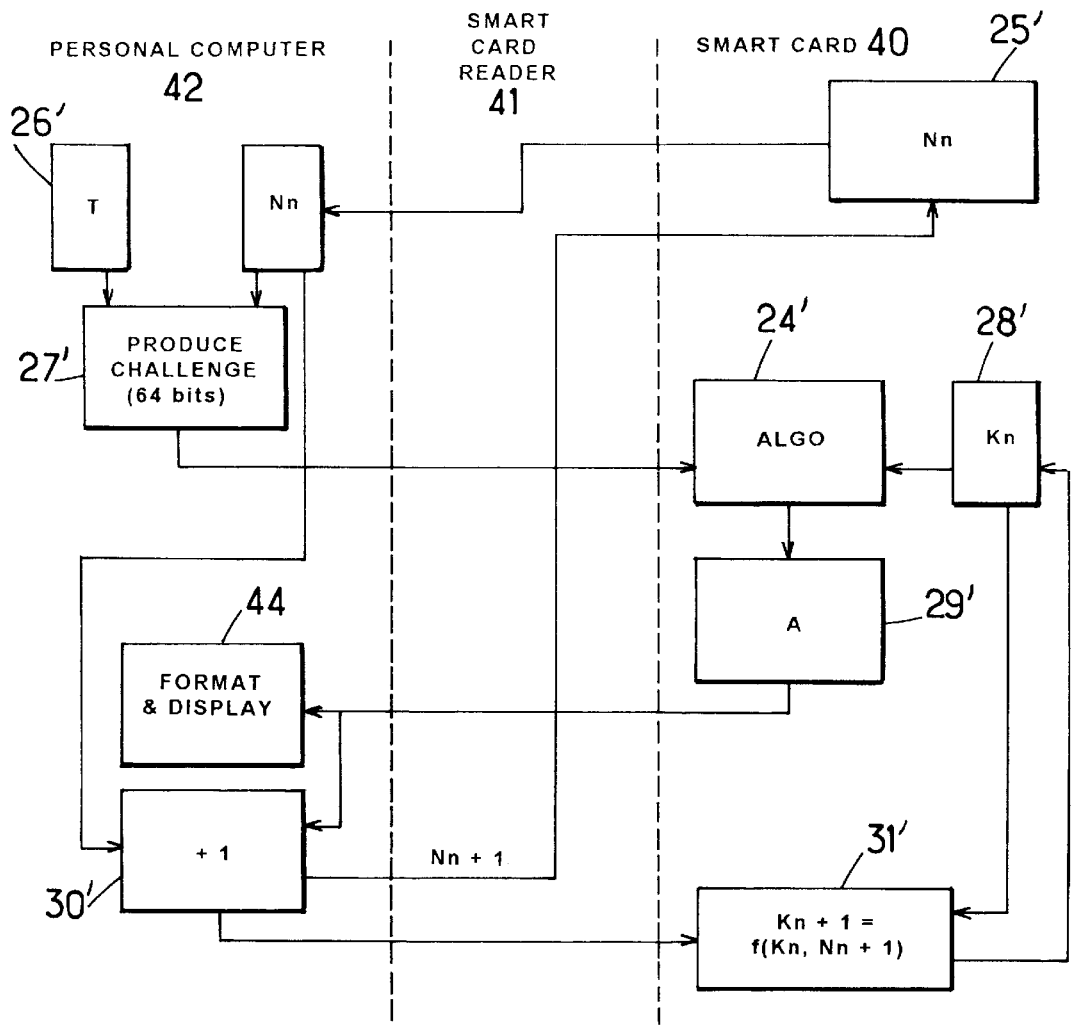
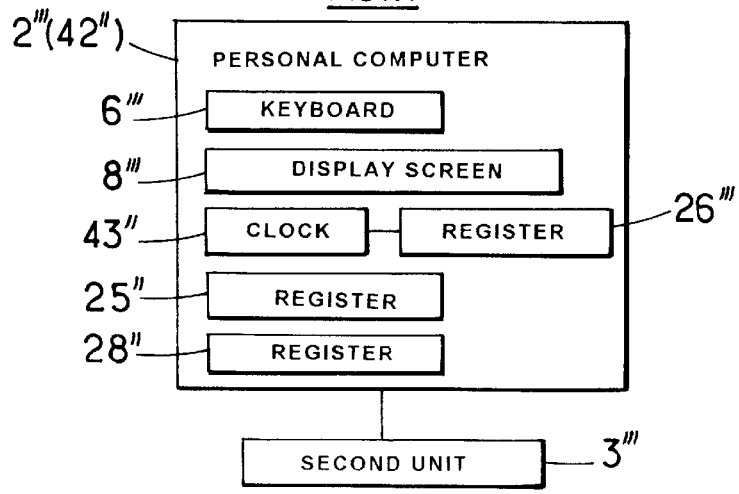

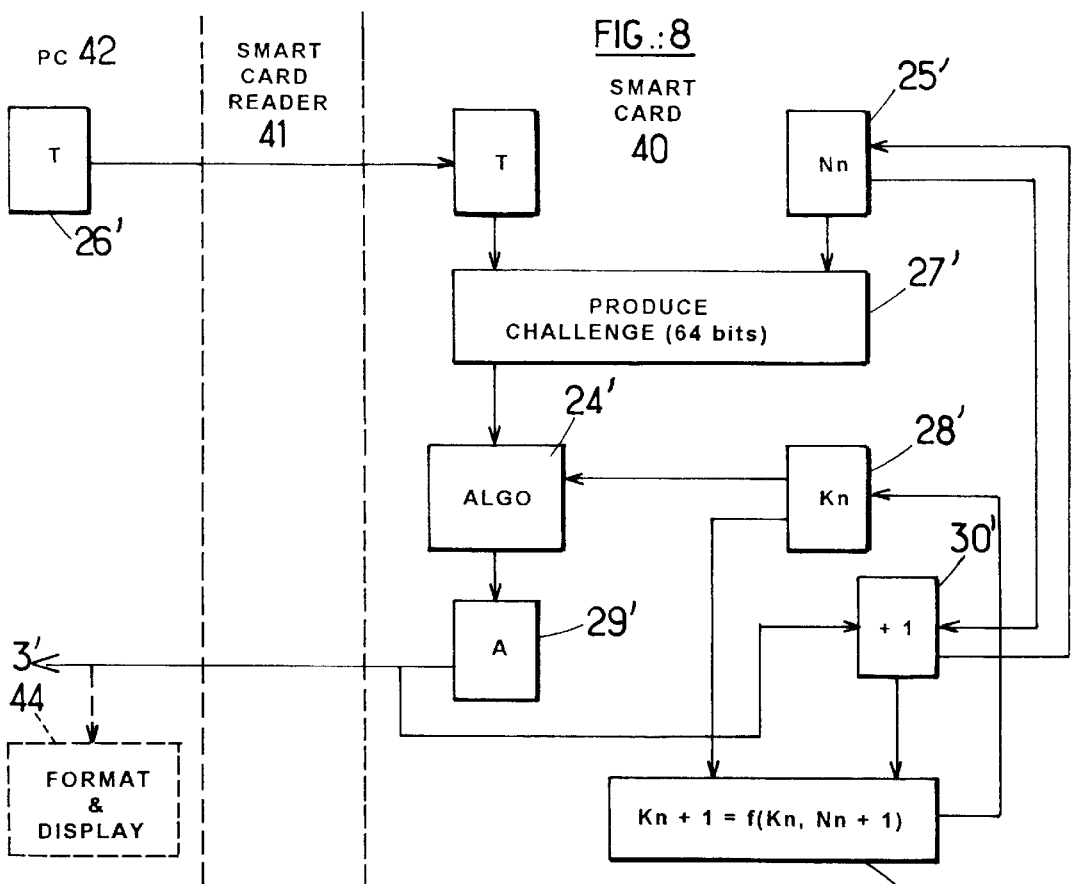
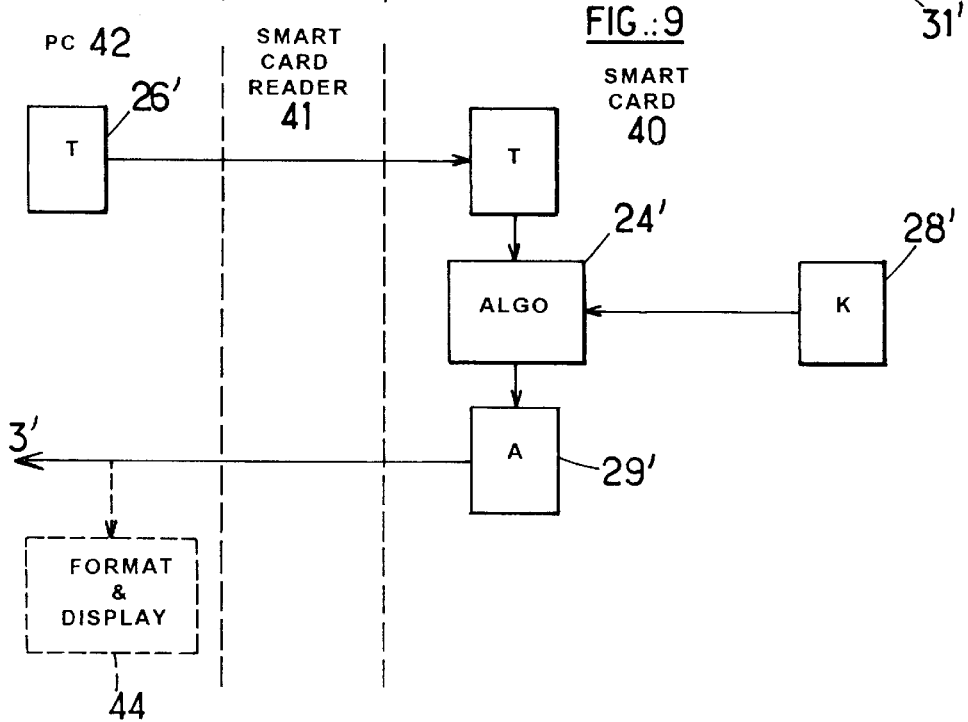

SYSTEM AND METHOD FOR USER AUTHENTICATION EMPLOYING DYNAMIC ENCRYPTION VARIABLES

CROSS REFERENCE TO RELATED APPLICATIONS

This is a continuation-in-part of U.S. application Ser. No. 08/620,240, filed Mar. 22, 1996, now U.S. Pat. No. 5,802,176, the disclosure of which is hereby incorporated by reference.

Cross-reference is hereby made to copending U.S. application Ser. No. 08/944,071, filed on the same date and by the same inventor as the present application and entitled "System for Controlling Access to a Function Having Clock Synchronization" and incorporated by reference herein. That co-pending application is a continuation-in-part of U.S. application Ser. No. 08/620,162, filed Mar. 22, 1996.

BACKGROUND OF THE INVENTION

1. Field of the Invention

The present invention relates to an electronic system for control of access to a function enabling a user conditionally to obtain a service or some other provision from a specialized service unit associated with the system in question.

More particularly, the invention relates to a system for control of access to a computer or more generally to a computerized network, use of which is reserved for persons having been duly legitimately entitled. Such networks may serve for example to provide all kinds of services entailing a transaction, usually with a monetary consideration, such as television shopping, pay television, home banking, interactive televised games, or also confidential faxes etc.

2. Description of Related Art

An example of a prior system of this type is described in U.S. Pat. No. 3,806,874. This patent discloses a personal identification or authentication system which generates passwords by encoding binary-decimal time data and two fixed numbers. In this system, an identification unit (a card) generates first and second data sequences (passwords) in accordance with an individual personal number, secret data and binary digital time data from a first clock. The individual personal number is transmitted to a testing unit (a server). The testing unit generates first and second data sequences by encoding the personal identification number, secret data and binary-decimal time data from a second clock. The binary-decimal time data are independently supplied by the separate clocks in the identification unit and the testing station. More particularly, identification unit 10 includes primary store 12 which stores an individual personal number in ROM and secret circuit 20 which stores secret data in secret store 26 and which generates the first and second data sequences. The secret data vary from user to user and are unknown to the user. The secret circuit 20 has an encoding circuit which produces the first and second data sequences by encoding input data including the individual personal number, the secret data and binary-decimal time data from clock 42. The server includes a primary store 12 which stores an individual personal number in ROM and a secret circuit 20 which stores secret data in secret store 26 and which generates the first and second data sequences (passwords). The secret circuit 20 has an encoding circuit which produces the first and second data sequences by encoding input data including the individual personal number, the secret data and binary-decimal time data from clock 42.

In the server, a secret circuit 31, which corresponds to secret circuit 20 in the card, includes secret store 33 and receives a time input from clock 53. Secret circuit 31 also receives an input (the individual personal number) from primary store 12 in identification unit 10. Secret circuit 31 has an encoding circuit which produces first and second data sequences (passwords) by encoding input data including the individual personal number, the secret data and binary-decimal time data from clock 53. The first data sequences are compared in comparator 30 in the card. If they match, the second data sequences are compared in comparator 41 in the server. If the second data sequences match, an acceptance signal is generated. Comparator 30 compares (1) the first data sequence obtained from the server during the same time interval that the first data sequence was generated in the testing station with (2) the first data sequence generated in the card during the same time interval. In other words, the comparator 30 must receive the first data sequence from the server during the same time interval that it was generated so that this received data sequence will match the first data sequence generated in the identification unit during this same time interval. The same statement applies to the second data sequence compared by comparator 41.

Both of the secret circuits 20 and 31 of U.S. Pat. No. 3,806,874 produce passwords (verification numbers) by encoding the individual personal number, the secret data and the binary-decimal data representing time to yield the first and second data sequences. To generate matching data sequences, the binary decimal time data employed in the identification unit and the testing station must be identical; thus, clocks 42 and 53 should be synchronized so that they will generate the same time data at substantially the same instant of time.

U.S. Pat. No. 4,601,011 discloses an authentication system which generates a password by enciphering a fixed number with a two-part key, a first part of which is non-changing and a second part of which varies each time the key is used for encryption. This system includes at least one portable electronic device (a card) and at least one electronic verification device (a server) which is intended conditionally to deliver authorizations for access to a computing facility. The system generates passwords which in one embodiment are a function of time and in another are a function of the number of passwords generated in the portable remote unit. The remote unit generates in an enciphering module a different password for each transmission by using a two-part key. The server receives the password from the card and generates an internal password by enciphering a fixed number (corresponding to the fixed number enciphered in the card) with the first key part (stored in memory) and the second key part (received from the card). Comparator 50 compares the received password and the internal password and provides an output which grants/denies access to computing facility 56 based on the comparison result.

Both the system of U.S. Pat. No. 4,601,011 and the system of U.S. Pat. No. 3,806,874 produce identical passwords ("data sequences" or "encrypted verification numbers") in both a card and a server, wherein the units independently compute the passwords by performing an encoding program on data including at least a fixed individual personal code and at least a number that represents time or that varies as a function of the number of passwords generated in the card.

U.S. Pat. No. 4,720,860 discloses another authentication system employing a static variable and a dynamic variable to generate passwords. In this patent, for every transaction to be accomplished, a fixed code is entered into the card by the user at the start of the access request procedure. This fixed code constitutes a static variable. A second variable is also produced, and the latter varies dynamically as a function of time, especially as a function of the instant at which the fixed code is entered into the card by the user. The two variables, the one static and the other dynamic, are next used as input parameters of a secret encryption algorithm implemented in order to produce a password in the card. This password is displayed on the card and the user is invited to transfer it into the server. The fixed code is also transferred to the server, and the server, by using the same encryption algorithm, together with a dynamic variable, in principle with the same value as that used in the card, also calculates the password. The latter is compared with the password transmitted to the server by the user, and in the event of matching, authorization for access to the function can be delivered. This access control system thus employs a static variable from which the encryption algorithm calculates the password while also using the dynamic variable. In this system, the static variable is stored in memory in the card and is transmitted to the server, for example over a telephone line; thus, it is vulnerable to being discovered by hackers via electronic eavesdropping or the like. Therefore, in this system, the algorithm must necessarily be kept secret in order to preserve the security of the system. If the secrecy of the algorithm were broken, the security of the whole of the system would thus be compromised due to the relative case by which the static variables may be discovered by electronic eavesdropping or the like. This explains why in this patent, means are provided for destroying the algorithm in the event of attempted fraud on the card (for example by storing the algorithm in volatile memory).

It will be noted, moreover, that in both the aforesaid U.S. Pat. No. 3,806,874 and U.S. Pat. No. 4,720,860, the second variable is a time-dependent dynamic value. Since this variable is necessarily produced independently, both in the card and in the server, the clocks of these two facilities used to produce the dynamic variable on each side, must be synchronized with a given accuracy. So as not to have to provide overly accurate clocks (which would considerably increase the cost of the system), a tolerance range has to be accepted inside which the current password remains valid. The shorter the tolerance range, the greater is the security provided, but the more problematic also is a lack of synchronization of the clocks.

In view of this tolerance range, the password calculated with each access request still remains valid for the duration of each interval separating two operations of calculating the dynamic variable. Such an interval may have a relatively long duration (typically 10 minutes or more, for example) so that an eavesdropper surreptitiously obtaining the password and the static variable for a card on the occasion of an access request will have time to use it throughout the aforesaid interval in the server and will thus easily be able to obtain access authorization.

U.S. Pat. No. 4,800,590 also discloses an authentication system employing a time-dynamic encryption key. Specifically, this system employs, as the input parameter for an encryption algorithm, an encryption key used as a dynamic variable which is altered as a function of time. This process requires the periodic updating of the encryption key, for example at a given frequency of one minute. Although this is easily implemented in the card, the same is not the case as regards the server. Indeed, the system can include a large number of users, each in possession of a card assigned a dynamic variable which is obviously unique for this card. Consequently, in the system known from U.S. Pat. No. 4,800,590, the server must periodically recalculate all the encryption keys at once or update the encryption key in one access request, by iterative calculations, the encryption key of a card requesting an access. It is appreciated that if the system includes a large number of cards (typically 100,000, for example), the updating of the encryption keys quickly becomes a crippling calculational burden to the server. This patent also discloses updating the key in response to user actuation of a switch; this embodiment is disadvantageous in limiting the frequency of key modification.

U.S. Pat. No. 5,060,263 also discloses a system which generates a dynamic password. In this system, a password generator produces each password by encrypting the previously generated password which is used as a variable. A plurality of fixed encryption keys are stored in the card. In order to enhance security, the server generates a random number for designating one key out of the plurality of keys which will be used for producing the password. The card must repeat the encryption sequences (by means of a public algorithm of the DES type) as many times as there are keys in the card, thereby looping the output into the input. In this prior system, the keys thus have fixed values in spite of the fact that they are randomly selected. However, they may be obtained by fraud in the memory of the card. Further, the random number generated in the server must be transmitted to the card and may be intercepted by fraud during transmission. Another problem arises in this system if the card user does not complete an access request in the server. In that case, there will be serious out-of-synchronization problems since each password is generated on the basis of the previous password so that the offset becomes more and more important over time. Some mechanism must then be provided for restoring synchronization.

SUMMARY OF THE INVENTION

The purpose of the present invention is to provide an access control system offering improved security against fraud.

Accordingly, the present invention provides a system for control of access of at least one user to a function, including at least one first unit personalized for the user and at least one second verification unit controlling access to the function. The first unit may be portable if need be and is often referred to as a card, although it is not necessarily card-like.

The first unit comprises:

first generator means for producing at least two variables;

first calculating means for producing a first password with the aid of at least one first encryption algorithm using input parameters dependent on the variables; and means for transmitting said first password to the second unit.

The second unit comprises:

second generator means for, in response to an access request made by way of a specified one of the first units, producing at least two variables assigned to this same specified first unit;

second calculating means for producing a second password with the aid of at least one second encryption algorithm using input parameters dependent on the variables delivered in the second unit;

means for comparing the first and second passwords; and means for, in the event of a predetermined consistency of the passwords, delivering an authorization of access to the function, wherein the first and second generator means provided respectively in the first and second units are configured so as to deliver at least two dynamic variables produced in concert, but independently in the first and second units. The dynamic variables must agree in the first and second units, i.e., they must have a predetermined relationship, e.g., identity.

It follows firstly from these features that the first units of the system do not contain in their memory for the calculation of the password any static variable liable to be fraudulently discerned, for example by spying. Another advantage is that the encryption algorithm need not necessarily be secret and if such is the case, it is possible to dispense with means for destroying this algorithm in the event of fraud.

It is true that if a public algorithm is used, at least one of the dynamic variables must be secret, but in the event of the fraudulent discovery of such a variable (which is specific to the first unit), only the first unit concerned loses its security whereas the system itself preserves its security completely.

Thus, according to another feature of the present invention, the first and second generator means respectively include third and fourth calculating means for producing at least a first of the dynamic variables according to a function involving the number of access requests formulated by the first unit prior to the current access request in progress.

It follows from this particularly advantageous feature that by virtue of the present invention, the updating of a first one of the dynamic variables, which is used for example as an encryption key, need not be performed periodically and does not require, in the second unit or server, any recalculation or "making up" of the value of the dynamic variable calculated in respect of a prior access request, as compared with the current value of this calculated dynamic variable residing in the first unit at the time an access request is formulated. The calculational work of the server is therefore reduced to a minimum.

Certainly, it may happen that the number of access requests accounted by the first unit is greater than that recorded by the server owing to the fact that the user of the first unit may not always complete an access request. However, in this case the server will at worst have to make up only a very small number of iterations in order to recalculate the dynamic variable. Furthermore, the gap between the numbers of access requests accounted respectively in the two units could be limited as a matter of course, by construction. Also, in one embodiment described hereinafter, such gap between the numbers of accounted access requests is obviated.

Moreover, it will also be observed that by virtue of the invention, if an individual fraudulently obtains a password which has just been obtained by an authorized user of a given first unit and is transferred legitimately by the authorized user to the server, this stolen password will not culminate in an access authorization. Indeed, a new access request by the unauthorized individual, even formulated very speedily afterwards, will produce a password which differs from that which will be calculated in the server, since the dynamic variable of the first unit will then have altered through the increasing of the number of access requests by one unit.

According to one embodiment of the present invention, an access control system is provided for control of access of at least one user to a function, the system including at least one first unit personalized for the user and at least one second verification unit controlling access to the function.

In this embodiment, the first unit comprises:
first generator means for producing at least two dynamic variables;
first calculation means for producing a password in accordance with at least one first encryption algorithm using input parameters dependent on the dynamic variables; and
means for transmitting the password to the second unit.

The second unit comprises:
second generator means for, in response to an access request made by way of a specified one of the at least one first unit, producing at least two dynamic variables assigned to the specified one of the at least one first unit;
second calculation means for decrypting the password in accordance with at least one decryption algorithm using as a decryption key an input parameter dependent on a first one of the dynamic variables produced in the second unit to derive a dynamic variable that should correspond to one of the dynamic variables produced in the first unit;
comparator means for comparing the dynamic variable derived by the second calculation means with a second one of said dynamic variables produced in the second unit; and
means, responsive to the comparator means determining that a predetermined relationship exists between the dynamic variable derived by the second calculation means with said second one of the dynamic variables produced in the second unit, for delivering an authorization of access to the function;
wherein the first and second generator means provided respectively in the first and second units produce the at least two dynamic variables in concert, but independently.

BRIEF DESCRIPTION OF THE DRAWINGS

Other features and advantages of the invention will be apparent from the following description, which is given merely by way of example and undertaken with reference to the appended drawings in which:

FIG. 1 is a general diagram of an access control system according to a first embodiment of the invention;

FIG. 2 is a simplified flowchart illustrating the principle of the unfurling of the operations in the system according to the invention, when an access request is processed;

FIG. 3 shows a flowchart of the mode of calculating an encryption key used for calculating the password;

FIG. 4 shows a block diagram illustrating a second embodiment of the invention; and FIG. 5 shows a flow chart of operations involved in calculating the password using the second embodiment shown in FIG. 4;

FIG. 6 shows a block diagram illustrating a third embodiment of the invention;

FIG. 7 shows a block diagram illustrating a fourth embodiment of the invention; and FIGS. 8 and 9 show alternative versions of the operations shown in FIG. 5.

DESCRIPTION OF THE PREFERRED EMBODIMENTS

Represented in FIG. 1 is a very simplified diagram of an access control system according to a first embodiment of the invention.

The system is assumed to grant conditional access to a function which in FIG. 1 is symbolized with the rectangle 1. The term "function" should be taken in a very broad sense. It designates any function to which access is conditioned by authentication involving authentication entailing verification of the tool (card) with the aid of which the request is formulated, and preferably also identification of the person requesting access to the function so as to ascertain whether his request is legitimate.

The function may be of any nature, for example a function for access to premises, to a computerized network or to a computer, to a transaction of a pecuniary nature (television shopping, home banking, interactive televised game, pay television) etc. The function may also involve the authentication of messages.

It may be seen in FIG. 1 that the system according to the invention can, according to a particular embodiment, include at least one first unit 2 referred to here as the "card" and at least one second unit 3. It will be noted that the access control system according to the invention can include a large number of first units and one or more second units, but in any event generally a considerably smaller number of second units than first units. The numbers of units 2 and 3 therefore in no way limit the invention.

The first unit or card 2 is preferably portable and a personalized so as to be assigned personally to a given user. It takes for example the form of a pocket calculator and it bears a public identification number (user ID) 5 indicated diagrammatically in FIG. 1. This number can be registered therein unenciphered and be assigned thereto at the time of its initialization. It can also be formed by the name of the user or any other information specific to him. The personal identification number (PIN) is secret and is usually memorized by the authorized user of the card. To use the card, the PIN is entered into the card by the user via keypad 6; the card compares the entered PIN with a stored value. If the entered PIN and the stored value match, the user is granted access to the card; if not, the card will not function to generate a password. The user communicates the user ID to server 15 in a manner as described below. The user ID identifies the particular card 2 from among the plurality of such cards in the overall access control system.

The card 2 includes a keypad 6 intended to allow the entry of information, such as for example the personal identification number (PIN) already mentioned, as well as various function buttons 7. It also includes a display screen 8 and an integrated circuit 9 which includes in particular a duly programmed microcontroller as well as the customary ROM and RAM memories. The card 2 preferably also includes its own source of electrical energy, such as battery 9A.

The card 2 also includes a communication device 10 making it possible to communicate with the unit 3 either directly or via a more or less long-distance transmission link. This device can take numerous forms, for example a DTMF telephone link, a device for transmitting and receiving data by infrared rays, a so-called "connected mode" device into which the card is inserted in an appropriate reader or any other transmission device well known in the art.

The second unit 3 comprises interface means which allow for the provision of communication with the card 2 by means of communication device 10. In the embodiment represented in FIGS. 1 and 2, these interface means are symbolized with a rectangle 12; they may take numerous forms. They may for example be a specially dedicated reader, but they may also take the form of a computer terminal, a personal computer inserted for example into a network, a personal computer equipped with an infrared type interface etc. Their particular feature is that they can communicate in an appropriate form with the card or cards associated therewith.

The interface means 12 can comprise a keypad 13 and a display screen 14 to enable the user to enter information to be communicated to a part 15 of the second unit 3, such as for example passwords or data to be authenticated and relating to the function 1. However, these data can be entered in other ways, in particular automatically without manual intervention from the user, for example simply upon entering the card into the interface 12 or by one of the function buttons 7 causing an infrared transmission.

The interface 12 communicates with the other part 15 (hereafter referred to as the server) of the unit 3 referred to in the present description. This communication symbolized by the connection 16 can be done at short-range or long-range by any appropriate means. The information flowing over this connection is in particular the password to be subject to control in the server 15 and possibly data to be authenticated and operated on by the server.

The server 15 comprises in particular a processor 17 and a memory 18. The processor is capable of conditionally freeing the functions 1, addressed by the access requests formulated by various cards, it being possible for these functions to be carried out inside the server (as symbolized in FIG. 1) or outside. It should be noted that the server 15 generally cooperates with a large number of cards by way of interfaces such as the interface 12.

FIG. 2 represents a simplified flowchart of the various operations which unfurl when a request for access to a function is formulated by the user of a card. FIG. 2 is divided into two parts, the part to the left of the dotted line 19 representing the operations executed in the card 2 and the part to the right of this line showing those which unfurl in the part 15 or server of the unit 3.

To initiate the procedure in the server 15, the public identification number (user ID) must firstly be communicated to the server 15. This operation can be carried out in various ways. For example, it may be communicated directly to the server 15 as soon as the card is inserted into the interface 12. It can be input directly into the keypad 13 of the interface by the user himself, or else into the keypad 6 of the card 2 and be transferred by the link 10. Communication can also be effected via a remote link, such as a telephone line or by Hertzian link.

The user must also input his entitlement by punching, at 20, his secret personal identification code or PIN code into the keypad 6 of the card 2. The code punched in is verified at 20 against the PIN code stored in the memory of the card. In the event of mismatch, the access request is refused straightaway at 22, the user possibly being allotted several consecutive attempts before being faced with final denial, if they are all abortive.

If on the other hand the PIN code entered and the PIN code in memory match, the program triggers, at 23, the operation for calculating the password.

This calculation consists in an encryption with the aid of an encryption algorithm which may be secret or public (block 24). In the latter case, it may be an algorithm referred to as DES (Data Encryption Standard) by those skilled in this art.

According to the invention, the algorithm in question uses input parameters dependent on dynamic variables which, in the case represented, are three in number. One of them is a variable Nn which is stored in a register 25 and which represents the number of access requests made by the card, and another is a variable T representing current time and corresponding to the position of a counter 26. Upon initialization of each card, those variables may be set at starting values, NO and/or TO respectively which need not be equal to zero and which may be secret or not. Also, Nn and T may vary according to predetermined functions involving as parameters among others the number of access requests, a function of the number of access requests, and current time, respectively.

The variables Nn and Tn may each include 32 bits and be subjected to a concatenation operation, at 27, thereby offering an input parameter of 64 bits in total. The operation at 27 may alternatively be any predetermined processing or combination such as an interleaving, hashing, exclusive ORing, ANDing etc operation performed on Nn and Tn. In other words, the operation at 27 is not limited to these alternatives but may be any operation performed to produce an output (e.g. 64 bits) from combining or processing Nn and Tn in one of virtually an infinite number of possible ways.

The third dynamic variable is a secret dynamic encryption key Kn used by the algorithm, at 24, to encrypt the input parameter arising from the concatenation operation at 27. The encryption key Kn is stored in a register 28 and is updated with each access request as explained below. Other ways of defining the algorithm performed at 24 is that the algorithm generates a password as a function of the current values of Nn, Tn and Kn or that Kn is encrypted in accordance with a key comprising a value produced by concatenating Nn and Tn at 27.

The encryption performed at 24 generates a password A at 29 and causes incrementation by one unit, at 30, of the position of the access request register 25 which stores Nn. The incremented number Nn+1 is stored in register 25 and subjected to a calculation operation at 31 for computing the new value Kn+1 of the third dynamic variable or secret encryption key. Alternatively, the output of unit 30 could cause incrementation of register 25 by another number besides one, i.e., the incrementation could be by two units (or any other number) each time. Also, the number of units of incrementation could vary with each access request. Of course, the incrementation must be synchronized with that carried out in server 15.

An example of the operations which can be performed in order to calculate this new value is represented in FIG. 3. These operations are performed in concert both in the card 2 and in the server 15. Firstly, the values Nn+1 and Kn are subjected at 32 to a logical combination operation, for example an EXCLUSIVE-OR combination. The resulting intermediate variable Z is subjected to encryption at 33 with the aid of a known or public algorithm which may be the same as that used at 24. The encryption can be performed with the aid of an encryption key which is preferably the value of the current dynamic variable Kn, although any other secret key Q (block 34) may alternatively be used.

The result of the encryption operation 33 is the new value Kn+1 of the encryption key which will be used during the next access request. This value is stored in register 28.

After obtaining the password A which is displayed on the screen 8 of the key, the user is invited to communicate it to the unit 3. It is to be noted that this password may be the entire result of the encryption operation 24 (64 bit length) or only a part thereof, for example a 32 bit word. The communication (symbolized by the dashed line 35) may be done for example by inputting the word into the keypad 13 of the interface 12. This communication can also be carried out automatically via the link 10 or through any other appropriate means of communication as previously described.

When the public identification number 5 is entered into the unit 3, the program of the server 15 executes, in concert with the card and with the aid of dynamic variables produced independently of the card 2, calculation operations which are identical to those executed in the latter. These operations have therefore been indicated in FIG. 2 with the same numerical references followed by the letter "a", as are the registers and the counter serving to produce the dynamic variables Nna, Ta and Kna. The variable Kna is extracted from the memory 18 of the server 15 in response to the access request, for example by transferring the identification number 5 to the interface 12. The memory 18 stores the variables Kna of every card with which the server is called upon to cooperate.

Consequently, the server 15 produces, on its side, and without the dynamic variables produced in the card 2 being communicated to it, a password Advisory Action which will be compared with the password A communicated to the server 15 by the user. If the card is authentic, the passwords A and Advisory Action should be identical or at least agree according to specified rules. If the test performed at 36 culminates in an affirmative response, the function at 1 is freed. In the contrary case, access will be refused at 37.

It is to be noted that in a system according to the invention some problems may arise when one of the dynamic variables is time or a function thereof as described above, since drift of the clocks used both in the cards and in the server cannot be avoided. An advantageous solution of this problem is disclosed and claimed in copending application Ser. No. 08/944,071 for "System for Controlling Access to a Function Having Clock Synchronization" by the instant inventor and filed on the same date as the present application and incorporated by reference herein and constituting a continuation-in-part of U.S. application Ser. No. 08/620, 162, filed Mar. 22, 1996.

It is therefore observed that, according to the invention, the process of authentication of the card leading to the freeing of the function at 1 is carried out with the aid of at least two dynamic variables, one of which is the encryption key Kn (Kna) and the other of which may be either the number Nn (Nna) of access requests already made, or the time T (Ta) (or numbers calculated according to a predetermined function of those variables). As described above, three variables may be employed such as Kn(Kna), Nn(Nna) and T(Ta) with the variables Nn(Nna) and T(Ta) being combined, for example, through a concatenation operation.

The encryption key Kn (Kna) itself varies from one access request to another and varies dynamically as a function of the value Nn (Nna) with which it may be combined logically, and then encrypted so as to give rise to the encryption key Kn+1 (Kan+1) used during the next access request.

According to a modification of the invention, a transfer of data from the card 2 to the unit 3 can be envisioned so that these data may be processed while accomplishing the function 1, to the extent naturally that authorization has been granted therefor following the test 36.

The user while formulating his access request enters at 38 the data into the card 2 with the aid of his keypad 6. These data are combined logically at 39 with the concatenated value of the two variables Nn and T, the result being used as an input parameter for the encryption procedure performed at 24. As an alternative, the data may also be directly combined with the result of the encryption operation in 24. The essential aspect is that the input to 24 must be a function of the data being transferred.

The data are also communicated to the server 15, for example by means of the keypad 13 of the interface 12 or automatically via the link 10 and the link 16.

In the server 15, the data thus received at 38 are processed in the same way as in card 2. Specifically, the data may be combined through a logical operation at 39a with the concatenated value of Nn and T, with the result being an input parameter for the encryption procedure at 24a. Alternatively, the data may be directly combined with the result of the encryption operation at 24a or the data could be another key provided to algorithm module 24a. The data are also communicated unenciphered to the facilities executing the function 1.

Thus, the authenticity of the data can be verified by comparing the passwords A and Advisory Action each of which is a function of the value representing the data. Execution of the function 1 will therefore also be opposed by a denial if there is mismatch between the data presented on both sides.

Various alternatives will now be described. While some of these alternatives are described e.g. with respect to modifications of the operations in card 2, it will be appreciated that like modifications apply to server 15 since card 2 and server 15 must be capable of generating identical passwords A, Advisory Action.

Function 31 (shown in FIGS. 2 and 3) can alternatively vary as a function of T. Also, the algorithm 33 could be changed each time a new Kn is generated. Similarly, the algorithm performed by unit 24 could also be changed each time a password is generated. For example, modules 24, 24a and 33, 33a could store plural algorithms, with different algorithms being used for different password generation operations. Synchronized changes with respect to function 31a, algorithm 33a and algorithm 24a would be implemented in server 15.

Additionally, function 32 (FIG. 3) can be another function besides an exclusive OR operation, such as an AND operation, or any other logical operation. Additionally, function 32 could be dispensed with, such that Nn+1 could be input directly into algorithm 33, so as to be encrypted by Kn or Q. Also alternatively, Q could be exclusive ORed at 32 with Nn+1, with either Kn or Q being used as a key for encrypting the output of logical operation 32.

Another modification is that an AND gate can be provided between elements 29 and 30 of FIG. 2, with the output of element 29 being one input into this AND gate and a signal from server 15 being another input into this AND gate, the signal from server 15 being generated only when element 29a generates an output. This signal from server 15 can be any type of communication signal, such as by a telephone line, or it could be an infrared signal. In this manner, element 25 in card 2 and element 25a in server 15 will be incremented in synchronization. Thus, there will not be a loss of synchronization between Nn and Nna. However, in some practical applications of this invention, such communication from the server back to the card may be undesirable.

Another alternative is that data 38 could be stored in memory in card 2. For example, data 38 could be, if card 2 is a banking card, data representing an account balance or an account number, and so on.

With respect to rederivation of Kn in functions 31 and 31a, such rederivation could also be performed as follows. Kn could be rederived twice for each password generation; for example, Kn could be rederived both before and after a password generation. Also, Kn can be rederived in parallel with the password generation process; in other words, Kn can be rederived while a password is being generated by having the output of module 24 and module 24a directly input into module 30 and 30a, respectively.

Also alternatively, Nn and T could be directly input into algorithm module 24. Also, DATA could be logically com-bined directly with Nn or T, or DATA could be divided into two parts and each part logically combined with one of Nn or T.

The second embodiment of the invention will now be described in detail with reference to FIGS. 4, 5A and 5B and will be explained primarily in terms of its differences from the first embodiment. Elements corresponding to elements of the first embodiment will be indicated with the same reference numerals, except primed; e.g., first unit 2' of the second embodiment corresponds to first unit 2 of the first embodiment. Except as explicitly set forth herein, any features of the first embodiment can be incorporated into the second embodiment.

As has been explained above, in the first embodiment, first unit 2 is a card or token, preferably portable, having its own source of electrical energy such as battery 9A. Card 2 also includes keypad 6, display source 8 and processor (e.g., integrated circuit) 9 and includes the ability to produce clock pulses to provide variable T.

The mechanisms described in the first embodiment can also be embedded in any other device possessed by the user, and offering the same characteristics, i.e., having its own source of energy 9A, a keypad 6, processor 9, the ability to produce clock pulses and a display 8 or a way to directly transmit the password to the second unit (communication channel). Such a device can be, e.g., a personal digital assistant (PDA), a phone, or a cellular phone.

The second embodiment allows many of these features to be removed from the card itself, thus simplifying the card. As shown in FIG. 4, the second embodiment includes first unit 2' and second unit 3'. First unit 2' includes smart card 40, smart card reader 41 and a computer such as a personal computer (PC) 42 to which smart card reader 41 is connected by a suitable interface such as an RS-232 or parallel port, a keyboard or a PCMCIA interface.

Integrated circuit 9' of smart card 40 stores the variable Nn in register (event counter) 25' and secret dynamic encryption key Kn in register 28' and executes cryptographic algorithm ALGO. Keypad 6' and display screen 8' of first unit 2' are not located on card 40, but instead are provided by the keyboard and display screen of personal computer 42. In this embodiment the password generated by the smart card is transmitted directly to the PC. Thus, the use of the PC screen to display the password is optional. The password, once in the PC, can be transmitted directly to the host (second unit) without being presented to the user. Computer 42 also includes clock 43 for incrementing counter 26' which provides variable T representing the time.

Second unit 3' can be the same as second unit 3 of the first embodiment.

FIG. 5 shows a flow chart of operations involved in calculating the password in first unit 2' and corresponds to the left side of the flow chart of FIG. 2.

More particularly, in FIG. 5, once the user has been identified by first unit 2' through the introduction of the secret personal identification number or PIN into keypad 6', PC 42 reads the content Nn of event counter 25' in smart card 40. At 27', Nn and variable T stored in counter 26' of PC 42 are concatenated or otherwise processed, as disclosed with respect to the first embodiment, to produce an input parameter or challenge of, for example 64 bits. This challenge is input by computer 42 into smart card 40 and is encrypted by the algorithm ALGO performed at 24' using encryption key Kn stored in register 28'.

The encryption performed at 24' generates at 29' the password A which is formatted and communicated to server 15' of second unit 3' as disclosed above with reference to FIG. 2. Of course, if personal computer 42 communicates password A directly to second unit 3', as by a modem, password A need not be displayed to the user.

The encryption performed at 24' also causes incrementation at 30' of the value of N, and the new value Nn+1 is stored in register 25' of smart card 40. The incrementation can be an incrementation by one or another sort of incrementation, as described above with respect to the first embodiment. The incremented number Nn+1 is also subjected to a calculation operation at 31' to compute a new value Kn+1 for the third dynamic variable or secret encryption key; this calculation operation has also been described with respect to the first embodiment.

There is another embodiment shown in FIG. 8, that simplifies the software implemented on the PC and limits the exchange of information between the PC and the smart card and the display. What is missing in the smart card is the clock counter 26 (T). All the other functions involved in the generation of the password can be implemented in the smart card.

Once the user has been identified by first unit 2' through the introduction of the secret personal identification number or PIN into keypad 6', PC 42 sends variable T stored in counter 26' to smart card 40. At 27', Nn and variable T are concatenated or otherwise processed, as disclosed with respect to the first embodiment, to produce an input parameter or challenge of, for example 64 bits. This challenge is encrypted by the algorithm ALGO performed at 24' using encryption key Kn stored in register 28'.

The encryption performed at 24' generates at 29' the password A which is formatted and displayed on screen 8' at 44. This password A is communicated to server 15' of second unit 3' as disclosed above with reference to FIG. 2. Of course, if personal computer 42 communicates password A directly to second unit 3', as by a modem, password A need not be displayed to the user.

The encryption performed at 24' also causes incrementation at 30' of the value of N, and the new value Nn+1 is stored in register 25' of smart card 40. The incrementation can be an incrementation by one or another sort of incrementation, as described above with respect to the first embodiment. The incremented number Nn+1 is also subjected to a calculation operation at 31' to compute a new value Kn+1 for the third dynamic variable or secret encryption key; this calculation operation has also been described with respect to the first embodiment.

A simplified version of this embodiment, shown in FIG. 9, could be to eliminate the event counter and key derivation, i.e., the other dynamic variables besides T. This simplified version distinguishes from the prior art because the clock counter is not generated where the algorithm and the keys are stored and implemented. The prior art discloses implementations in which the clock generation is performed where the algorithm and keys are stored. One embodiment of the present invention involves a "virtual token" based on a time variable generated outside the smart card by the PC or the intelligent reader and transmitted to the smart card to produce the password using a static key stored in the smart card (FIG. 9). It is advantageous because no permanent power supply in the card is required. As a further simplification, the key could be static, as shown in FIG. 9.

Smart card reader 41 shown in FIGS. 4 and 5 is a passive or "dumb" smart card reader; that is, it simply transmits data between smart card 40 and PC 42. Alternatively, smart card reader 41 could be an active or "intelligent" smart card reader and could be portable. The third embodiment of the invention, directed to the use of such an "intelligent" smart card reader, is shown in FIG. 6.

As shown in FIG. 6, in first unit 2", "intelligent" smart card reader 41' reads smart card 40 of the second embodiment and is adapted for use with second unit 3", which can be like second unit 3 or 3'. Smart card reader 41' comprises keyboard 6", display screen 8", register 26" and clock 43' corresponding to keyboard 6', display screen 8', register 26' and clock 43 and could also include its own source of electrical energy, such as battery 9A', corresponding to battery 9A. Such a smart card reader can perform the functions shown for PC 42 in FIG. 5.

As described above, the smart card reader could be configured to supply T, and the smart card could be configured to perform the other operations of the first unit. Alternatively, as described above, the clock could be provided by the PC 42 to smart card reader 41', thus eliminating the need for clock 43' in reader 41'.

A first unit like first unit 2, 2' or 2" could also be implemented as a personal computer programmed with appropriate software to perform the calculations shown in FIG. 5 for both smart card 40 and PC 42. In such a case, the smart card could be done away with.

An example is shown in FIG. 7 and constitutes the fourth embodiment of the invention. Elements corresponding to elements of the previous embodiments are illustrated with the same reference numerals, but with an additional prime mark.

First unit 2'" is implemented completely in personal computer 42". Second unit 3'" can be like the second units of the previous embodiments. Personal computer 42" includes keyboard 6'", display screen 8'" and clock 43" and is configured in hardware, software or both to implement registers 25", 26'" and 28".

A first unit like first unit 2, 2',2" or 2'" could also be implemented in any device possessed by the user, such as a personal digital assistant (PDA), a cellular telephone or another type of telephone, as long as such a device is configured in hardware, software or both to perform as shown in FIG. 5 or 8.

It will be appreciated by persons skilled in the art that the present invention is not limited to what has been particularly shown and described herein and in particular is not limited to the embodiments set forth above. Rather, other modifications can be made within the scope of the invention. Also, modifications disclosed separately can be combined. Therefore, the scope of the present invention is defined only by the claims which follow.

I claim:

1. A user authentication system for control of access of at least one user to a function, said system including at least one first unit personalized for said user and at least one second verification unit controlling access to said function, (a) said first unit comprising:
first generator means for producing at least two dynamic variables;
first calculation means for producing a first password in accordance with at least one first encryption algorithm using input parameters dependent on said dynamic variables; and
means for transmitting said first password to said second unit;

(b) said second unit comprising:
second generator means for, in response to an access request made by way of a specified one of said at least one first unit, producing at least two dynamic variables assigned to said specified one of said at least one first unit;

second calculation means for producing a second password in accordance with at least one second encryption algorithm using input parameters dependent on said dynamic variables produced in said second unit;

comparator means for comparing said first and second passwords; and means, responsive to said comparator means determining that a predetermined relationship exists between said passwords, for delivering an authorization of access to said function;

wherein said first and second generator means provided respectively in said first and second units produce said at least two dynamic variables in concert, but independently.

2. The system as claimed in claim 1, wherein said first and second generator means respectively include third and fourth calculation means for producing at least a first one of the dynamic variables according to a function involving a number of access requests made by said first unit prior to a current access request in progress.

3. The system as claimed in claim 2, wherein said third and fourth calculation means respectively generate an intermediate dynamic variable by logical combination of said number of access requests made and a current value of said first dynamic variable.

4. The system as claimed in claim 3, wherein said third and fourth calculation means respectively perform, by means of third and fourth algorithms, an encryption of said intermediate dynamic variable, the result of this encryption constituting a new value of said first dynamic variable.

5. The system as claimed in claim 4, wherein said third and fourth calculation means respectively comprise means for encrypting said intermediate dynamic variable with said first dynamic variable used as a secret encryption key in respect of said third and fourth encryption algorithms.

6. The system as claimed in claim 4, wherein said third and fourth calculation means respectively comprise means for encrypting said intermediate dynamic variable with an encryption key which differs from said first dynamic variable and is used in respect of said third and fourth encryption algorithms respectively.

7. The system as claimed in claim 4, wherein said third calculation means and said fourth calculation means transfer the result of said encryption by said third and fourth encryption algorithms to said first and second calculation means respectively as an encryption key in respect of said first and second encryption algorithms.

8. The system as claimed in claim 7, wherein said first and second generator means respectively generate a second one of said dynamic variables as a function of said number of access requests made and transfer said second dynamic variable to said first and second calculation means respectively, and wherein said first and second calculation means encrypt an input datum comprising said second dynamic variable, in accordance with said first and second encryption algorithms respectively.

9. The system as claimed in claim 8, wherein said first and second generator means respectively generate a third one of said dynamic variables as a function of current time and transfer said third dynamic variable to said first and second calculation means respectively and wherein said first and second calculation means incorporate said third dynamic variable in said input datum.

10. The system as claimed in claim 9, wherein said first and second calculation means respectively perform a concatenation of said second and third dynamic variables to produce said input datum.

11. The system as claimed in claim 4, wherein said third and fourth encryption algorithms are identical to said first and second encryption algorithms.

12. The system as claimed in claim 1, wherein said first and second generator means respectively transfer a first one of said dynamic variables to said first and second calculation means as an encryption key in respect of said first and second algorithms and produce an input datum comprising a second one of said dynamic variables consisting of a number of access requests made by said first unit prior to a current access request in progress, said input datum being transferred to said first and second calculation means respectively so as to be encrypted therein by said first dynamic variable.

13. The system as claimed in claim 12, wherein said first and second generator means respectively comprise third and fourth calculation means for producing said encryption key as a function of said number of access requests made.

14. The system as claimed in claim 13, wherein said third and fourth calculation means respectively comprise memory storage means and generate, from the current value of said encryption key, a new value of said encryption key and store said new value in said memory storage means as replacement for said current value.

15. The system as claimed in claim 1, wherein said first unit comprises means for storing data intended to be transferred to said second unit so as to be used in accomplishing said function and said second unit comprises means for receiving said data, and wherein said first and second generator means comprise means for transferring said data respectively to said first and second calculation means so as to serve as a component of at least one of said dynamic variables to be encrypted.

16. The system as claimed in claim 1, wherein the first unit is a portable device comprising a source of electrical energy.

17. The system as claimed in claim 16 comprising communication means in said first and second units, said communication means comprising a DTMF telephone link for allowing communication of information between first and second said units.

18. The system as claimed in claim 16 comprising communication means in said first and second units, said communication means comprising an infrared communication device for allowing communication of information between said units.

19. The system as claimed in claim 1, wherein the first unit is a portable device comprising a card.

20. The system as claimed in claim 1, wherein said first unit comprises:

a card reader; and a card adapted for being read by said card reader.

21. The system as claimed in claim 20, wherein:

the card comprises a first portion of the first generator means, the first portion for producing a first one of the at least two dynamic variables; and the first unit further comprises a processor in communication with the card, the processor comprising a second portion of the first generator means, the second portion for producing a second one of the at least two dynamic variables.

22. The system as claimed in claim 21, wherein the processor is disposed in the card reader.

23. The system as claimed in the claim 21, wherein the processor is disposed in a computer connected to the card reader.

24. The system as claimed in claim 21, wherein the second one of the at least two dynamic variables varies as a function of time.

25. The system as claimed in claim 1, wherein the first unit is one of a personal computer, personal digital assistant and telephonic device and programmed to function as the first generator means and the first calculation means.

26. The system as in claim 1 wherein said predetermined relationship between said passwords is equality.

27. The system as in claim 9, wherein said first and second calculation means respectively process said second and third dynamic variables to produce said input datum.

28. The system as in claim 1, wherein said first and second encryption algorithms are different from one another and have a predetermined relationship with one another such said first password and said second password have said predetermined relationship.

29. A user authentication system for control of access of at least one user to a function, said system including at least one first unit personalized for said user and at least one second verification unit controlling access to said function, (a) said first unit comprising:
   first generator means for producing at least two dynamic variables;
   first calculation means for producing a password in accordance with at least one first encryption algorithm using input parameters dependent on said dynamic variables; and
   means for transmitting said password to said second unit;

(b) said second unit comprising:
   second generator means for, in response to an access request made by way of a specified one of said at least one first unit, producing at least two dynamic variables assigned to said specified one of said at least one first unit;
   second calculation means for decrypting said password in accordance with at least one decryption algorithm using as a decryption key an input parameter dependent on a first one of said dynamic variables produced in said second unit to derive one of said dynamic variables produced in said first unit;
   comparator means for comparing said dynamic variable derived by said second calculation means with a second one of said dynamic variables produced in said second unit; and
   means, responsive to said comparator means determining that a predetermined relationship exists between said dynamic variable derived by said second calculation means with said second one of said dynamic variables produced in said second unit, for delivering an authorization of access to said function;
   wherein said first and second generator means provided respectively in said first and second units produce said at least two dynamic variables in concert, but independently.

30. A user authentication system for control of access of at least one user to a function, said system including at least one first unit personalized for said user and at least one second verification unit controlling access to said function, (a) said first unit comprising:
   first generator means for producing at least one dynamic variable;
   first calculation means for producing a first password in accordance with at least one first encryption algorithm using input parameters dependent on said at least one dynamic variable; and
   means for transmitting said first password to said second unit;

(b) said second unit comprising:
   second generator means for, in response to an access request made by way of a specified one of said at least one first unit, producing at least one dynamic variable assigned to said specified one of said at least one first unit;
   second calculation means for producing a second password in accordance with at least one second encryption algorithm using input parameters dependent on said at least one dynamic variable produced in said second unit;
   comparator means for comparing said first and second passwords; and
   means, responsive to said comparator means determining that a predetermined relationship exists between said passwords, for delivering an authorization of access to said function;
   wherein said first and second generator means provided respectively in said first and second units produce said at least one dynamic variable for the first unit and said at least one dynamic variable for the second unit in concert, but independently;
   said first unit further comprising:
      a card containing the first calculation means;
      a processor disposed outside the card; and
      a card reader for providing communication between the card and the processor, wherein:
      said means for producing said at least one dynamic variable for the first unit is contained in the processor and said at least one dynamic variable for said first unit is communicated by said card reader alone to said first calculation means in said card.

31. The system as claimed in claim 30, wherein said at least one dynamic variable for each of the first unit and the second unit varies as a function of time.

32. The system as claimed in claim 30, wherein the processor is disposed in the card reader.

33. The system as claimed in claim 30, wherein the first unit further comprises a computer in which the processor is disposed.

34. A user authentication method for control of access of at least one user to a function, said method comprising:
(a) producing at least two dynamic variables;
(b) producing a first password in accordance with at least one first encryption algorithm using input parameters dependent on said dynamic variables;
(c) in response to an access request made by a specified one of said at least one user, producing at least two dynamic variables assigned to said specified one of said at least one user;
(d) producing a second password in accordance with at least one second encryption algorithm using input parameters dependent on said dynamic variables produced in step (c);
(e) comparing said first and second passwords; and
(f) if a predetermined relationship exists between said passwords, delivering an authorization of access to said function;
wherein said at least two dynamic variables are produced in steps (a) and (c) in concert, but independently.

35. The method as claimed in claim 34, wherein each of steps (a) and (c) comprises producing at least a first one of the dynamic variables according to a function involving a number of access requests made by said at least one user prior to a current access request in progress.

36. The method as claimed in claim 35, wherein each of steps(a) and (c) comprises generating an intermediate dynamic variable by logical combination of said number of access requests made and a current value of said first dynamic variable.

37. The method as claimed in claim 36, wherein each of steps (a) and (c) comprises performing, by means of third and fourth algorithms, an encryption of said intermediate dynamic variable, the result of this encryption constituting a new value of said first dynamic variable.

38. The method as claimed in claim 37, wherein each of steps (a) and (c) comprises encrypting said intermediate dynamic variable with said first dynamic variable used as a secret encryption key in respect of said third and fourth encryption algorithms.

39. The method as claimed in claim 37, wherein each of steps (a) and (c) comprises encrypting said intermediate dynamic variable with an encryption key which differs from said first dynamic variable and is used in respect of said third and fourth encryption algorithms respectively.

40. The method as claimed in claim 37, wherein the result of said encryption are used as an encryption key in respect of said first and second encryption algorithms.

41. The method as claimed in claim 40, wherein a second one of said dynamic variables is generated in steps (a) and (c) as a function of said number of access requests made, and wherein said an input datum comprising said second dynamic variable is encrypted in accordance with said first and second encryption algorithms respectively.

42. The method as claimed in claim 41, wherein a third one of said dynamic variables is generated as a function of current time and wherein said third dynamic variable is incorporated in said input datum.

43. The method as claimed in claim 42, wherein a concatenation of said second and third dynamic variables is performed to produce said input datum.

44. The method as claimed in claim 37, wherein said third and fourth encryption algorithms are identical to said first and second encryption algorithms.

45. The method as claimed in claim 34, wherein a first one of said dynamic variables is used as an encryption key in respect of said first and second algorithms, an input datum is produced comprising a second one of said dynamic variables consisting of a number of access requests made by said first unit prior to a current access request in progress, said input datum being encrypted by said first dynamic variable.

46. The method as claimed in claim 45, wherein said encryption key is a function of said number of access requests made.

47. The method as claimed in claim 46, wherein, from the current value of said encryption key is generated.

48. The method as claimed in claim 34, wherein the predetermined relationship between the passwords is equality.

49. The method as in claim 42, wherein said second and third dynamic variables are processed to produce said input datum.

50. The method as in claim 34, wherein said first and second encryption algorithms are different from one another and have a predetermined relationship with one another such said first password and said second password have said predetermined relationship.

51. A user authentication method for control of access of at least one user to a function, said method comprising:

(a) producing at least two dynamic variables;

(b) producing a password in accordance with at least one first encryption algorithm using input parameters dependent on said dynamic variables;

(c) in response to an access request made by a specified one of said at least one user, producing at least two dynamic variables assigned to said specified one of said at least one user;

(d) decrypting said password in accordance with at least one decryption algorithm using as a decryption key an input parameter dependent on a first one of said dynamic variables produced in step (c) to derive one of said dynamic variables produced in step (a);

(e) comparing said dynamic variable derived in step (d) means with a second one of said dynamic variables produced in step (c); and (f) if a predetermined relationship exists between said dynamic variable derived in step (a) with said second one of said dynamic variables produced in step (c), delivering an authorization of access to said function;

wherein said at least two dynamic variables are produced in steps (a) and (c) in concert, but independently.

52. A user authentication method for control of access of at least one user to a function, said method comprising:

(a) producing at least one dynamic variable;

(b) producing a first password in accordance with at least one first encryption algorithm using input parameters dependent on said at least one dynamic variable;

(c) in response to an access request made by a specified one of said at least one user, producing at least one dynamic variable assigned to said specified one of said at least one user;

(d) producing a second password in accordance with at least one second encryption algorithm using input parameters dependent on said at least one dynamic variable produced in step (c);

(e) comparing said first and second passwords; and (f) if a predetermined relationship exists between said passwords, delivering an authorization of access to said function;

wherein said at least one dynamic variable in step (a) and said at least one dynamic variable in step (c) and generated in concert, but independently;

steps (a) and (b) being performed in a unit comprising:
a card;
a processor disposed outside the card; and
a card reader for providing communication between the card and the processor, wherein the processor performs step (a) and communicates the at least one dynamic variable to the card, which performs step (b).

53. The method as claimed in claim 52, wherein said at least one dynamic variable in each of steps (a) and (c) varies as a function of time.

* * * * *